United States Patent
Bishop et al.

(10) Patent No.: US 8,431,509 B2
(45) Date of Patent: *Apr. 30, 2013

(54) STRUCTURE FOR MOLECULAR SEPARATIONS

(75) Inventors: Karl D. Bishop, Orono, ME (US); Tyler J. Kirkmann, Brewer, ME (US); Susan G. MacKay, Veazie, ME (US)

(73) Assignee: Cerahelix, Inc., Orono, ME (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/098,444

(22) Filed: Apr. 30, 2011

(65) Prior Publication Data

US 2011/0287215 A1     Nov. 24, 2011

Related U.S. Application Data

(63) Continuation-in-part of application No. 12/262,164, filed on Oct. 30, 2008, which is a continuation-in-part of application No. PCT/US2009/062763, filed on Oct. 30, 2009.

(60) Provisional application No. 60/983,808, filed on Oct. 30, 2007, provisional application No. 61/383,879, filed on Sep. 17, 2010.

(51) Int. Cl.
*B01J 29/00* (2006.01)

(52) U.S. Cl.
USPC ............. 502/60; 502/7; 210/490; 210/500.25

(58) Field of Classification Search ............... None
See application file for complete search history.

(56) References Cited

U.S. PATENT DOCUMENTS

| | | |
|---|---|---|
| 4,310,440 A | 1/1982 | Wilson et al. |
| 5,716,526 A | 2/1998 | Kelemen et al. |
| 5,723,397 A | 3/1998 | Verduijn |
| 6,177,373 B1 | 1/2001 | Sterte et al. |
| 6,536,604 B1 * | 3/2003 | Brinker et al. ............... 210/490 |
| 6,620,402 B2 | 9/2003 | Jacobsen et al. |
| 6,667,265 B1 | 12/2003 | Tomita et al. |
| 6,730,537 B2 | 5/2004 | Hutchinson et al. |
| 7,195,872 B2 | 3/2007 | Agrawal et al. |

(Continued)

FOREIGN PATENT DOCUMENTS

JP       06239674       8/1994

OTHER PUBLICATIONS

Preparation of Porous Materials With Ordered Hole Structure. Marcus Liew Kai Hoa et al. Advances in Colloid and Interface Science 121 (2006) 9-23.*

(Continued)

*Primary Examiner* — Melvin C Mayes
*Assistant Examiner* — Colette Nguyen
(74) *Attorney, Agent, or Firm* — Greenberg Traurig, LLP; Chinh H. Pham; Fang Xie

(57) ABSTRACT

A process of producing a structure for molecular separations includes providing a plurality of template materials. The template materials are selected from biomolecules, biopolymers, polymers, or combinations thereof. A sieve material, suitable for producing a structure for molecular separations, is provided around the template materials. The template materials are positioned in an arrangement for leaving pores suitable for molecular separations. The template materials are removed to leave pores in the sieve material and produce the structure suitable for molecular separations.

23 Claims, 4 Drawing Sheets

U.S. PATENT DOCUMENTS

| | | |
|---|---|---|
| 7,229,944 B2 | 6/2007 | Shao-horn et al. |
| 7,357,836 B2 | 4/2008 | Tsapatsis et al. |
| 7,442,573 B2 | 10/2008 | Hutchison et al. |
| 7,608,554 B2 | 10/2009 | Tomita et al. |
| 7,626,192 B2 | 12/2009 | Hutchison et al. |
| 8,137,442 B2 | 3/2012 | Pintault et al. |
| 2006/0266696 A1 | 11/2006 | Masuda et al. |
| 2006/0278580 A1 | 12/2006 | Striemer et al. |
| 2007/0128423 A1 | 6/2007 | Belford et al. |
| 2007/0173399 A1 | 7/2007 | Lau et al. |
| 2007/0251389 A1 | 11/2007 | Katsir et al. |
| 2007/0265484 A1 | 11/2007 | Li et al. |
| 2008/0105613 A1 | 5/2008 | Ichikawa et al. |
| 2009/0114089 A1 | 5/2009 | Liu et al. |
| 2009/0131244 A1 | 5/2009 | Bishop et al. |
| 2009/0299043 A1 | 12/2009 | Martin et al. |
| 2010/0116130 A1 | 5/2010 | Carreon et al. |

OTHER PUBLICATIONS

Constructing Novel Materials With DNA. Thom Labean e al. Nanotoday. Apr. 2007 vol. 2, 26-35.*

Office Action issued in U.S. Application No. 13/293,703 mailed on Mar. 8, 2012.

Adhikari and Fernando., "Hydrogen Membrane Separation Techniques," Ind. Eng. Chem. Res. 45:875-881 (2006).

Becerril et al.., "Dna-Templated Nanofabrication," Chem.. Soc. Rev. 38: 329-337 (2009).

Davis et al., "Bacterial templating of ordered macrostructures in silica and silica-surfactant mesophases," Nature. 385:420-423 (1997).

Finkelmann, "Liquid Crystalline Polymers," Angew. Chem. Int. Ed. Engl 26(9):816-824 (1987).

Zhang et al., "Bacterial templating of zeolite fibers with hierarchical structure," The Royal Society of Chemistry. Chem. Commun. pp. 781-782 (2000).

Office Action issued in U.S. Appl. No. 12/262,164 mailed on Jun. 27, 2011.

Office Action issued in U.S. Appl. No. 13/293,703 mailed on Mar. 8, 2012.

Office Action issued in U.S. Appl. No. 13/293,703 mailed on Oct. 30, 2012.

Alam et al., Magnetic ordering in synthetic oligonucleotides. A deuterium nuclear magnetic resonance investigation, J Chem. Phys. 92 (11),1990, pp. 6840-6846.

Anderson, Green Technology for the 21st Century: Ceramic Membranes, Water Chemistry Program, University of Wisconsin-Madison, pp. 1-10.

Che et al., Synthesis and characterization of *chiral mesoporous silica*, Nature, vol. 429, 2004, pp. 281-284.

Fain, Development of Inorganic Membranes for Gas Separation, Manuscript U.S. Government Under Contract DE-AC05-98OR22700, pp. 1-10.

Ford et al., Platinated DNA as Precursors to Templated Chains of Metal Nanoparticles, Advanced Materials, 2001, pp. 1-5.

Freemantle, Membranes for Gas Separation, Chemical & Engineering News, 2005, vol. 83, No. 40, pp. 49-59.

Hoa et al., Preparation of porous materials with ordered hole structure, Advances in Colloid and Interface Science 121, 2006, pp. 9-23.

Jareman et al., The influence of the calcination rate on silicalite-1 membranes, Microporous and Mesoporous Materials 79, 2005, pp. 1-5.

Labean et al., Constructing novel materials with DNA, Nanotoday, 2007, vol. 2, No. 2, pp. 26-35.

Lecloux et al., High-temperature catalysts through sol-gel synthesis, Journal of Non-Crystalline Solids 225, 1998, pp. 146-152.

Moses et al., Characterization of Single- and Double-Stranded DNA on Gold Surfaces, American Chemical Society, 2004, pp. 11134-11140.

Ruckert et al., Alignment of Biological Macromolecules in Novel Nonionic Liquid Crystalline Media for NMR Experiments, J. Am. Chem. Soc., 2000, 122, pp. 7793-7797.

Solberg et al., Adsorption of DNA into Mesoporous Silica, J. Phys. Chem. B 2006, 110, pp. 15261-15268.

Vanwinkle et al., Magnetic-field alignment of cholesteric liquid-crystalline DNA, Physical Review E, vol. 55, No. 4, 1997, pp. 4354-4359.

Yu et al., Ultra-thin porous silica coated silver-platinum alloy nanoparticle as a new catalyst precursor, Chem. Commun. 2003, pp. 1522-1523.

* cited by examiner

US 8,431,509 B2

STRUCTURE FOR MOLECULAR SEPARATIONS

CROSS-REFERENCE TO RELATED APPLICATIONS

This application is a continuation-in-part of U.S. patent application Ser. No. 12/262,164, filed Oct. 30, 2008, which claims the benefit of U.S. Provisional Application No. 60/983,808, filed Oct. 30, 2007, the disclosures of which are incorporated herein by reference. This application is also a continuation-in-part of International Application No. PCT/US09/062763, filed Oct. 30, 2009, which claims priority from U.S. patent application Ser. No. 12/262,164, filed Oct. 30, 2008, the disclosures of which are incorporated herein by reference. This application also claims the benefit of U.S. Provisional Application No. 61/383,879, filed Sep. 17, 2010, the disclosure of which is incorporated herein by reference.

BACKGROUND OF THE INVENTION

A number of different technologies and structures are known for use in molecular separations. For example, molecular separation techniques include distillation, adsorption, crystallisation, extraction and membranes. Among the membranes used for molecular separations are zeolite membranes, microporous membranes and mesoporous membranes. Unfortunately, currently known membranes for molecular separations often have one or more drawbacks. For example, they may not be very useful for separating the particular molecules of interest. The membranes may be deficient in selectivity and/or flux, they may not be operable with a desired efficiency, or they may not be useful in a variety of applications.

Therefore, it would be desirable to provide improved structures for molecular separations and methods of producing these structures.

SUMMARY OF THE INVENTION

A process of producing a structure for molecular separations includes providing a plurality of template materials. The template materials are selected from biomolecules, biopolymers, polymers, or combinations thereof. A sieve material, suitable for producing a structure for molecular separations, is provided around the template materials. The template materials are positioned in an arrangement for leaving pores suitable for molecular separations. The template materials are removed to leave pores in the sieve material and produce the structure suitable for molecular separations.

An assembly for producing a structure for molecular separations includes a substrate and a plurality of template materials on the substrate. The template materials are selected from biomolecules, biopolymers, polymers, or combinations thereof. The template materials are positioned in an arrangement for leaving pores suitable for molecular separations when the template materials are removed. A sieve material is positioned on the substrate around the template materials. The sieve material has a composition and is shaped for producing the structure for molecular separations after removal of the template materials.

A membrane for molecular separations includes a membrane made from a suitable sieve material, the membrane having opposed major surfaces. The membrane has pores in at least one of the major surfaces. The pores have a diameter between about 5 angstroms and about 30 angstroms.

A process of producing a catalyst includes attaching catalytic materials to template materials. A catalyst substrate material is positioned around the template materials. The template materials are removed to leave pores in the catalyst substrate material, with the catalytic materials attached to or positioned in the pores.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
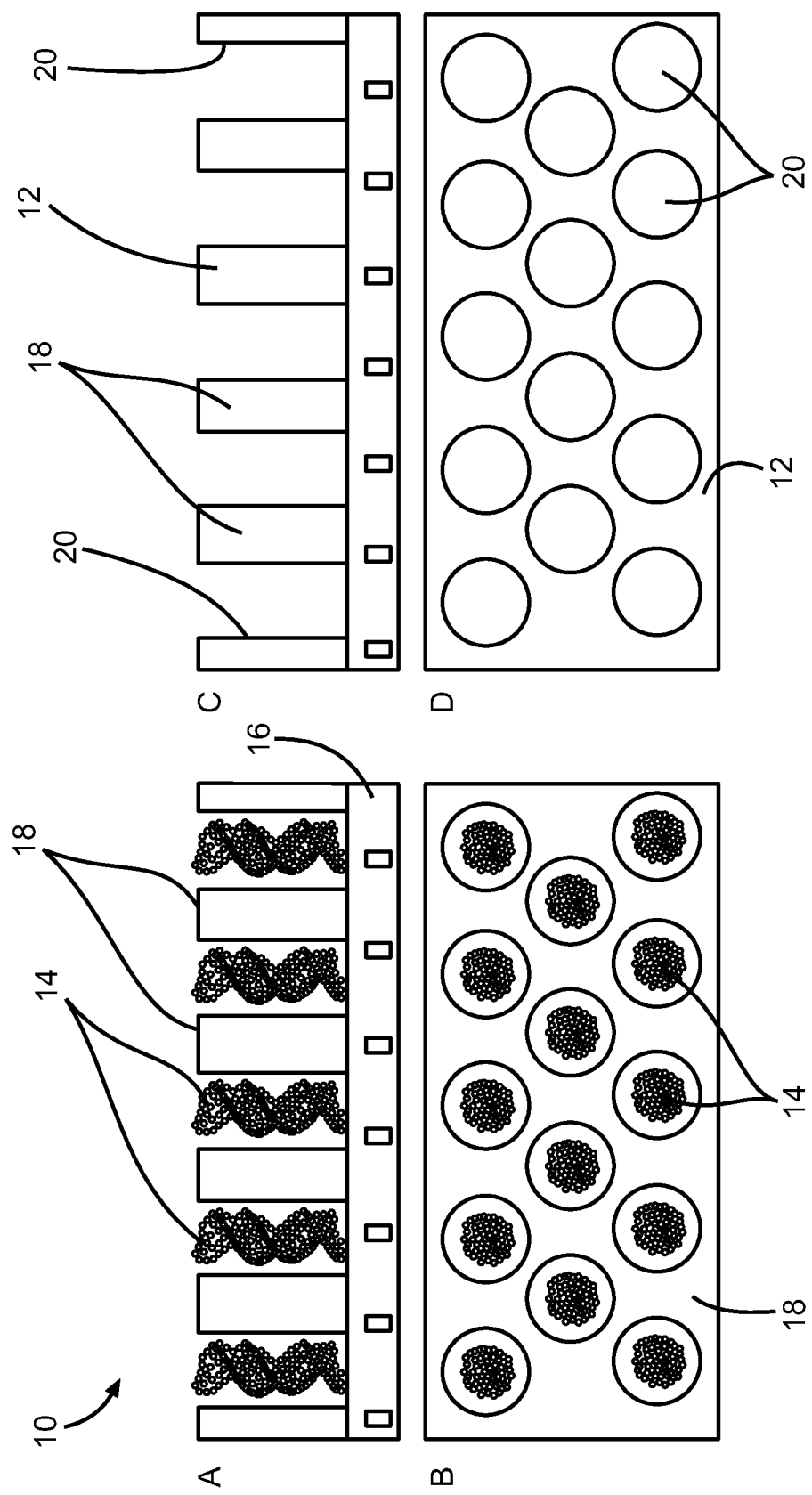
FIG. 1A is a side view of an assembly for producing a ceramic membrane for molecular separations, including DNA molecules attached or unattached to a surface, and a ceramic material applied onto the surface and around the DNA to form a membrane.
FIG. 1B is a top view of the assembly.
FIG. 1C is a side view of the ceramic membrane on the surface after the DNA molecules have been removed to leave pores extending through the membrane.
FIG. 1D is a top view of the ceramic membrane.

The invention relates to a process of producing an inorganic structure for molecular separations. The process includes providing a plurality of template materials. The template materials are selected from the group consisting of biomolecules, biopolymers, polymers, and combinations thereof. In certain embodiments, the template materials are selected from the group consisting of DNAs, RNAs, nucleic acid loops, nucleic acid hairpins, nucleic acid dumbbells, alkylated phosphonates, polyhydroxyalkanoates (e.g., polyhydroxybutyrate), non-standard nucleobases, or any combinations thereof. Any type of DNA and any type of RNA can be used, including single-stranded DNA, double-stranded DNA, triple-stranded DNA, quadruplex DNA, single-stranded RNA and double-stranded RNA. Some examples of biomolecules that could be used include collagen, keratin, elastin, tubulin, cellulose, chitin and starch. Some examples of synthetic polymers that could be used include poly(allylamine) and an entire class of compounds called liquid crystal polymers. The liquid crystal polymers have the desired feature of being able to form liquid crystalline phases. For example, they are described in a publication entitled "Liquid Crystalline Polymers" by Finkelmann, *Angew. Chem. Int. Ed. Engl.* 26 (1987) 816-824.

The double-stranded DNA molecule has physical and chemical characteristics that make it particularly suitable for use in the process. It has a diameter suitable for producing pores in an inorganic structure by the process as described below, and it has a length that can be controlled through means such as chemical synthesis and chemical manipulation by enzymes. DNA can be manipulated through external fields or through internal forces such as liquid crystalline formation or by attachment to surfaces using a variety of chemical and physical methods.

The template materials are provided in a sufficient number to leave pores in a structure effective for molecular separations as discussed below. The porosity of the ceramic material can vary widely, for example between 1% and 80%, depending on the particular structure and its application.

The process also includes providing a sieve material around the template materials. The sieve material can be any material that is suitable for producing the structure for molecular separations described herein, such as many of the materials typically used in molecular sieves. The sieve material may be thermally and chemically stable. In some embodiments, the sieve material may be a polymer or any other inorganic and/or organic material suitable for producing a molecular sieve.

In a particular embodiment, the sieve material is a material that produces a ceramic structure. The term ceramic refers to complex compounds and solid solutions of both metallic and nonmetallic elements joined by ionic and covalent bonds. Most often, ceramic materials are a combination of inorganic elements. Occasionally, ceramic materials may contain carbon. Examples of ceramic materials include but are not limited to metal oxides, compounds of metal oxides, metal carbides, and nitrides, and carbonates. More specifically, for example ceramic materials include but are not limited to silica, titania, alumina, titanium silicate, barium titanate, titanium carbide, titanium nitride, aluminum nitride, silicon carbide, and silicon nitride.

An suitable ceramic composition can be used. For example, the ceramic composition may be selected from the following:

| Matrix | Linkers/DNA coating | Doping |
|--------|---------------------|--------|
| $SiO_2$ | APTES | Ni |
| $TiO_2$ | TMAPS | Mn |
| $Al_2O_3$ | AEAPS | Pt |
| $ZrO_2$ | Spermidine/spermine | Rh (and others) |

The composition of the ceramic material can be selected for various properties by using various combinations of items from each of the three columns in the table above.

In certain embodiments, a polymer-ceramic membrane composition is used to increase the range of physical characteristics of the membrane. A purely ceramic membrane is sometimes brittle and can be damaged during use. Combining a polymer with the ceramic would produce a membrane with the separation characteristics of the ceramic-only membrane and the flexibility of a polymer membrane.

To form the membrane, ceramic powders can be co-deposited at various ratios with a polymer to produce a polymer/ceramic membrane. The membrane may have an improved flux rate over a ceramic, and may have an improved separation factor over a polymer membrane. The choice of polymer can be made to target a specific separations application. Some examples of polymers that could be suitable include but are not limited to polypropylene, poly(methyl methacrylate), and polyethylene glycol.

Methods of producing ceramic structures are well-known. For example, a sol-gel process uses ceramic precursors in solution. The precursor sol can be deposited to form a film or other structure, or cast in a suitable mold with the desired shape, and it forms a gel. The gel is subjected to thermal treatment and/or polymerization to form a solid ceramic structure.

In a particular example, the parameters determining sol-gel synthesis have been investigated. A criterion in the development of the DNA templated membrane is controlling the rate of sol-gel polymerization. In one embodiment, the DNA/sol-gel composite remains in a fluid state until it is placed in a magnetic (or electric) field wherein the DNA is given a chance to align. Once the alignment is complete the sol-gel may be polymerized quickly. Conditions such as pH, temperature, and solvent can influence polymerization rate. DNA has been encapsulated in a sol-gel, which polymerized in as short as 10 seconds and as long as 4 days.

The sieve material is formed into the desired shape of the structure for molecular separations. For example, this structure can be a membrane or other structure having any desired shape which can be either solid or hollow. In one embodiment, the sieve material is formed into a membrane by applying it onto a surface by any suitable method, such as pouring or spraying.

Any suitable membrane deposition method can be used. For example, the membrane deposition can include co-templating methods. Using DNA as a templating material in conjunction with one or more other removable templating materials can provide further versatility to the porous structure of a sol-gel product. DNA can be co-templated with materials such as dendrimers, polymer beads (e.g., polystyrene), or other common surfactants. Removal of co-templating templating material through the sol-gel procedures previously described will produce a ceramic material having pores of two or more shapes/sizes, one for each type of template. Physical contact between the DNA and co-template molecules will form a bridge between the two pores upon template removal, creating unique porous structures. Because DNA is a polyelectrolyte, attaching DNA to the surface of a second template can produce a polyelectrolyte brush (polyelectrolyte bridge), which is a central template particle with DNA strands branching outward in all directions. This templating approach would form a highly porous ceramic with very high flux due to the large co-template, and very narrow size cutoff due to the smaller interconnecting DNA channels. Co-templating of a catalytic ceramic (as described) can be tailored to improve porosity and transport to the catalytic sites, due to the larger pore sizes.

Alternatively, the membrane deposition can include dip coating or spin casting. Dip coating and spin casting are both deposition methods that can be used to create membranes from either a sol-gel or from a suspension of particles. Spin casting in most generally used for coating flat surfaces. Dip coating is more versatile in that many different shapes can be coated. Conditions such as temperature, humidity and speed must be controlled.

Alternatively, the membrane deposition can include slip-casting. Porous supports can be coated by slip-casting of a powder in suspension. Typically the suspension is drawn through the porous support, through a pressure drop, gravity, electric field, or some other force. The solvent passes through the porous support, and the powder coats the surface and can be further treated to form a continuous membrane.

Alternatively, the membrane formation can include attachment/hardening. A possible method for forming a DNA templated membrane is to form an oriented layer of the DNA on a substrate as described previously, then coat the DNA with the ceramic material and harden in place to form a continuous membrane.

Another alternative method of forming the membrane can include crystalline flakes. DNA can form a liquid crystal, and can be encapsulated in a ceramic material while in a liquid crystalline state. By forming a 2-dimensional liquid crystal phase films, platelets, or flakes with high aspect ratio can be encapsulated with DNA pores oriented and traversing the thickness of the flake. Due to the high aspect ratio, these flat films or powders can easily be deposited such that the pores are oriented perpendicular to the substrate.

A further alternative method of forming the membrane can include doping of ceramic. Binders or dopants can be added to the ceramic material before, during, or after gelation in order to reduce defects in the final product. These materials reduce defects in the ceramic by preventing shrinkage during curing, improving thermal resistance, or improving chemical or pH stability.

Various techniques can be used for eliminating defects in the membrane. Defects are a common problem to overcome when producing a membrane or thin film. When defects develop, they can be covered by addition of one or more membrane layers on top of the first, deposited before or after calcination. When producing a membrane from a powder, such as the flakes described above, defects or pores may occur, which would allow permeate to flow around the powders rather than through the DNA-pores as desired. These defects can be filled in by addition or co-deposition of a sol-gel or DNA templated sol-gel or polymer.

Sintering can be used to improve adhesion between a ceramic membrane and the substrate, improving the performance and lifetime of the membrane product.

The surface chemistry of the separations membrane can also be modified. Pore size is not the only factor in determining separations performance. The surface chemistry of a separations membrane affects both flux and separation factor for a particular separation. The top surface of the membrane can be modified prior to removal of the DNA template. Therefore, after removal of the template, the pore chemistry will differ from the surface chemistry, creating an affinity for certain types of separations. The pore surface can also be modified by attaching particles such as metal atoms to the DNA prior to templating. The surface modifiers can be left in place during removal of the DNA.

The sieve material is positioned around the template materials. This may include either partially or completely surrounding the template materials with the sieve material. For example, in one embodiment the template materials are surrounded on their sides but not on their ends with the sieve material. FIGS. 1A and 1B shows an example of an assembly 10 for producing a ceramic membrane 12 for molecular separations. A plurality of DNA molecules 14 are attached to the surface of a substrate 16. The attachment of the DNA molecules to the surface can be accomplished using a variety of known attachment chemistries. The choice of attachment chemistry will depend on the conditions and specifications of the desired molecular separation membrane to be produced. In alternative embodiments, the DNA molecules are not attached to the surface. A sol-gel 18 has been applied onto the substrate 16 and around the DNA molecules 14, the sol-gel surrounding the DNA molecules on their sides but not their ends.

In other examples, the template materials can be surrounded except for one end by the sieve material, or they can be encapsulated by the sieve material. For example, this may occur when the DNA molecules are mixed into a sol-gel, and then the sol-gel is formed into a desired structure for molecular separations.

The process also includes positioning the template materials in an arrangement for leaving pores suitable for molecular separations, after the template materials have been removed from the sieve material to leave pores as described below. This can include any suitable arrangement of the template materials relative to one another and relative to the molecular separations structure, and any suitable orientation or alignment of the template materials. In the example shown in FIGS. 1A and 1B, the DNA molecules 14 are arranged in a regular pattern and are equally spaced relative to one another. Also, the DNA molecules 14 are oriented so that they extend generally perpendicular to the surface of the substrate 16 and generally parallel with one another. Alternatively, the DNA molecules could be positioned in a non-perpendicular and/or non-parallel orientation.

The orientation of the template materials can be achieved by any suitable method. For example, it may be achieved by the use of a magnetic or electric field applied to the DNA molecules, or by mechanical means, or by other physical conditions (concentration, application, etc.). The presence and composition of a surface and a variety of other conditions can also influence the orientation of the template materials. Under certain conditions the template materials may orient themselves without the use of external means. The positioning of the template materials in the desired arrangement can take place either before or after the sieve material has been positioned around the template materials. In some embodiments, the positioning results in a highly oriented monolayer of template materials on a surface.

Some examples of methods of aligning DNA molecules or other template materials are as follows. In certain embodiments, the alignment of the DNA uses an electric field. DNA is negatively charged over a broad pH range. Since DNA is a long biopolymer with a negatively charged backbone it can be oriented in a constant or varying electric field.

Also, in certain embodiments, the alignment of the DNA uses a magnetic field. DNA has a physical property called magnetic birefringence. The result is that DNA will experience an asymmetric force in the presence of a constant ordered or varying magnetic field. The DNA will orient in response to the net force.

Further, in certain embodiments, the alignment of the DNA uses a Langmuir-Blodgett film (polar and nonpolar end groups). A Langmuir-Blodgett film contains one or more monolayers of a compound, deposited from the surface of a liquid onto a solid by immersing the solid substrate into or drawn from the liquid. The molecules are oriented on the surface of the liquid due to their amphipathic character—either a polar end group and a nonpolar tail with the polar head group interacting with the surface of a polar liquid and the nonpolar tails pointing away from the surface or a nonpolar head group interacting with the surface of a nonpolar solvent with the polar tails pointing away from the surface.

The alignment of the DNA can also involve attachment of the DNA. DNA can be chemically modified at one or both of its ends. This modification can be selected so that a chemical bond can form between the DNA and the surface. Therefore alignment can be induced by anchoring one end of the DNA strands to a surface and standing the strands up through the selection or control of solvent/DNA interactions.

Further, the alignment of the DNA can involve a liquid crystalline phase. The liquid crystalline state is a form of matter that has properties of a conventional liquid as well as long range order similar to what you might expect in a solid crystalline phase. Under specific conditions DNA will exhibit liquid crystalline phases. The physical conditions of the DNA solution can be controlled to induce long range orientation of the DNA in the desired configuration. Forming a liquid crystal and then orienting some of the DNA will propagate, or seed, orientation in the entire liquid crystal. This could be done in several ways including orientation of other types of liquid crystal molecules in the presence of DNA.

The process further includes removing the template materials to leave pores in the sieve material and produce a structure suitable for molecular separations. For example, as shown in FIGS. 1C and 1D, after the sol-gel 18 has hardened around the biopolymers to form a ceramic material, the DNA molecules 14 are removed to leave pores 20 in the ceramic material. The template materials can be removed by any suitable method. For example, they can be removed by calcining or any other known method.

Any suitable method can be used for template removal. In certain embodiments, one or more of the following methods can be used to facilitate removal of the DNA. For example, the template removal can involve heating. The DNA-sol gel composite material being heated to high temperatures (in excess of 300 degrees C.) in the presence of oxygen will convert most of the DNA into gaseous oxides of nitrogen and carbon, which diffuse out of the ceramic material.

The template removal can also use a solvent. Various solvent conditions (ionic strength, polarity, temperature, etc.) can be modified in an attempt to find optimum conditions for removing DNA form a sol gel.

The template removal can also use an acid. Covalent bonds in DNA can be broken in the presence of low pH (typically below 3). The breaking of bonds in DNA will facilitate its removal from a polymerized sol gel.

Alternatively, the template removal can use a supercritical fluid (e.g., $CO_2$). Supercritical fluids have physical properties between that of a liquid and that of a gas. There is also no surface tension, no gas-liquid boundary, low viscosity, high diffusivity. These properties make supercritical fluids ideal solvents for many applications including removal of template molecules from sol gel materials.

The template removal can also involve UV curing. Ultraviolet light (UV) has sufficient energy to modify chemical bonds and facilitate fragmentation of DNA. Illumination of a templated sol-gel by UV light for a duration of time will facilitate subsequent removal of the DNA template.

Figure 2:
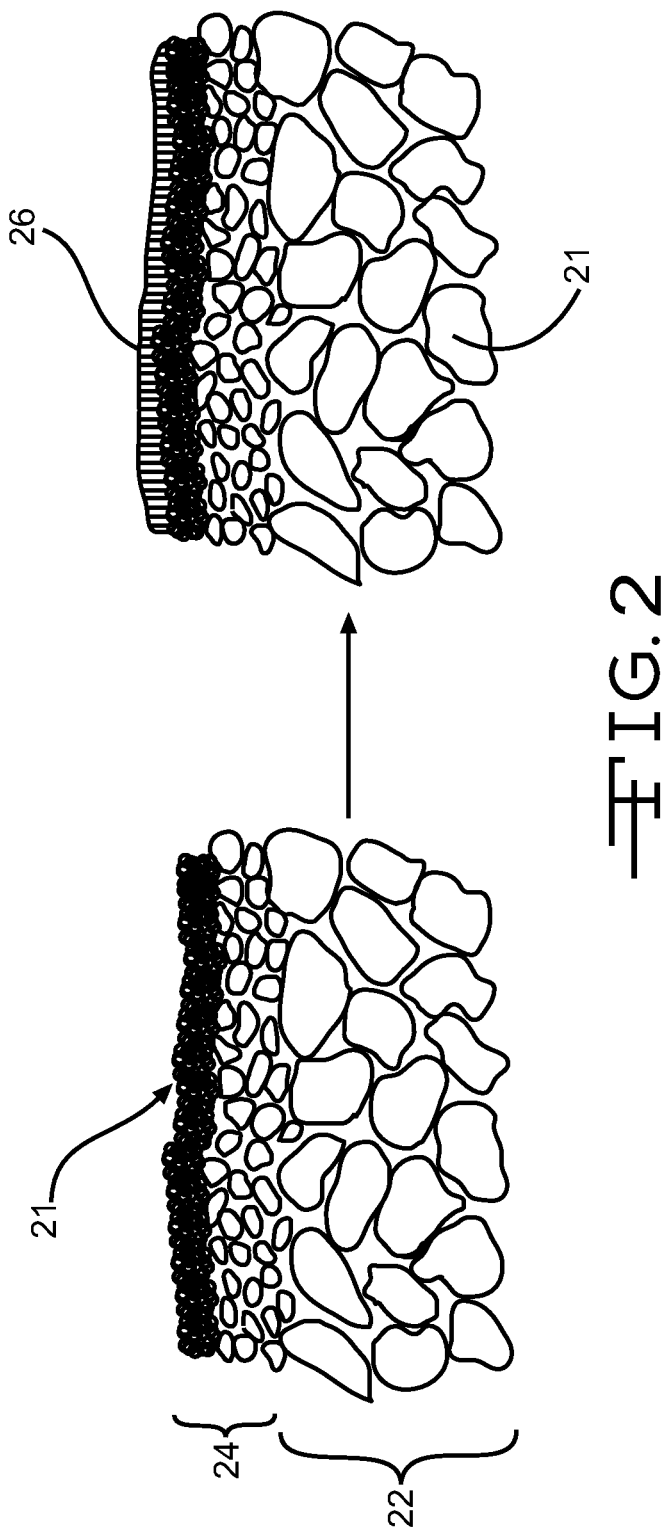
FIG. 2 is a cross-section of a ceramic membrane before and after deposition of DNA-sol gel.
Figure 3:
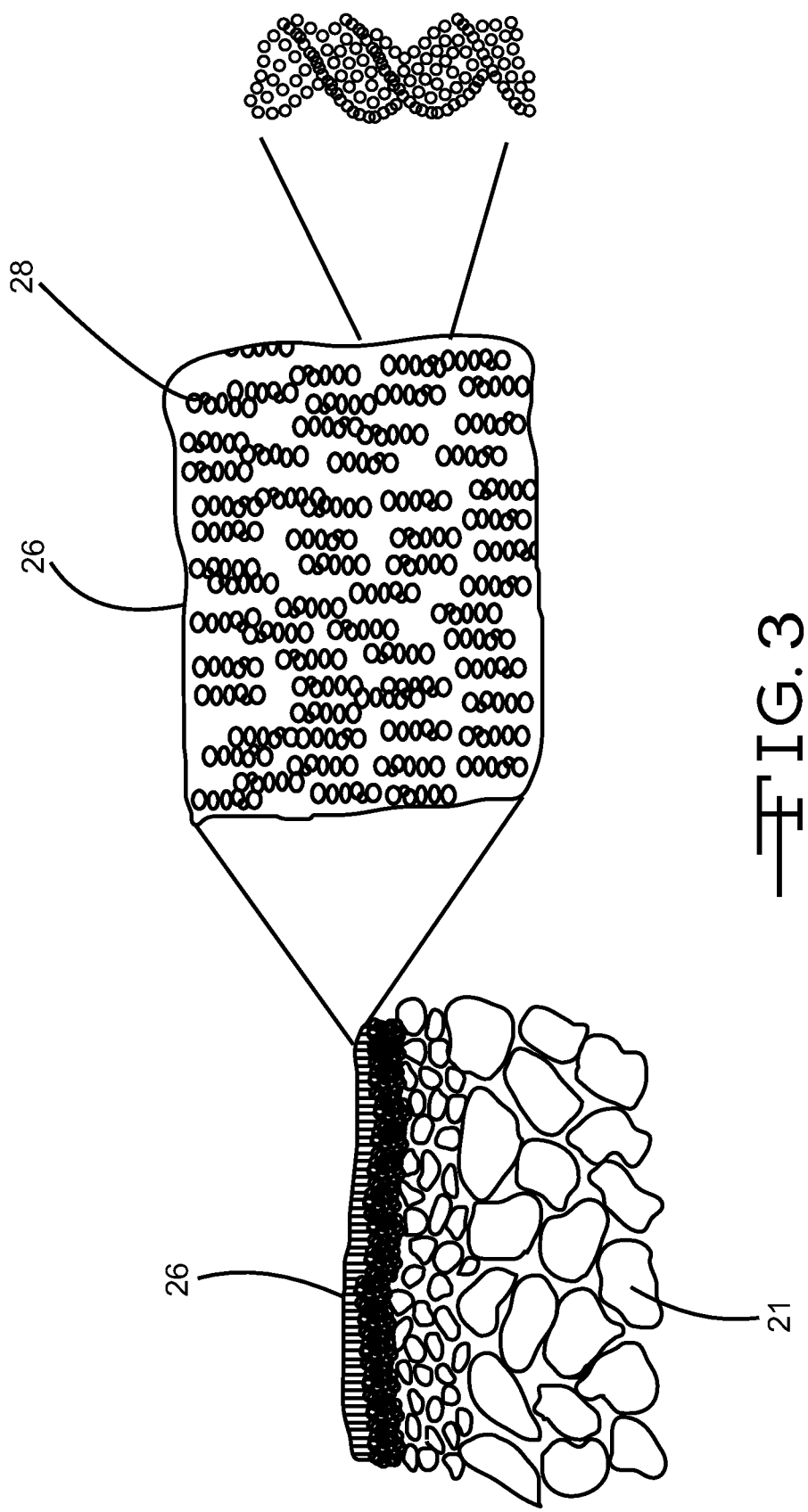
FIG. 3 is a detailed view of membrane material before calcination showing DNA aligned and oriented perpendicular to the surface.
Figure 4:
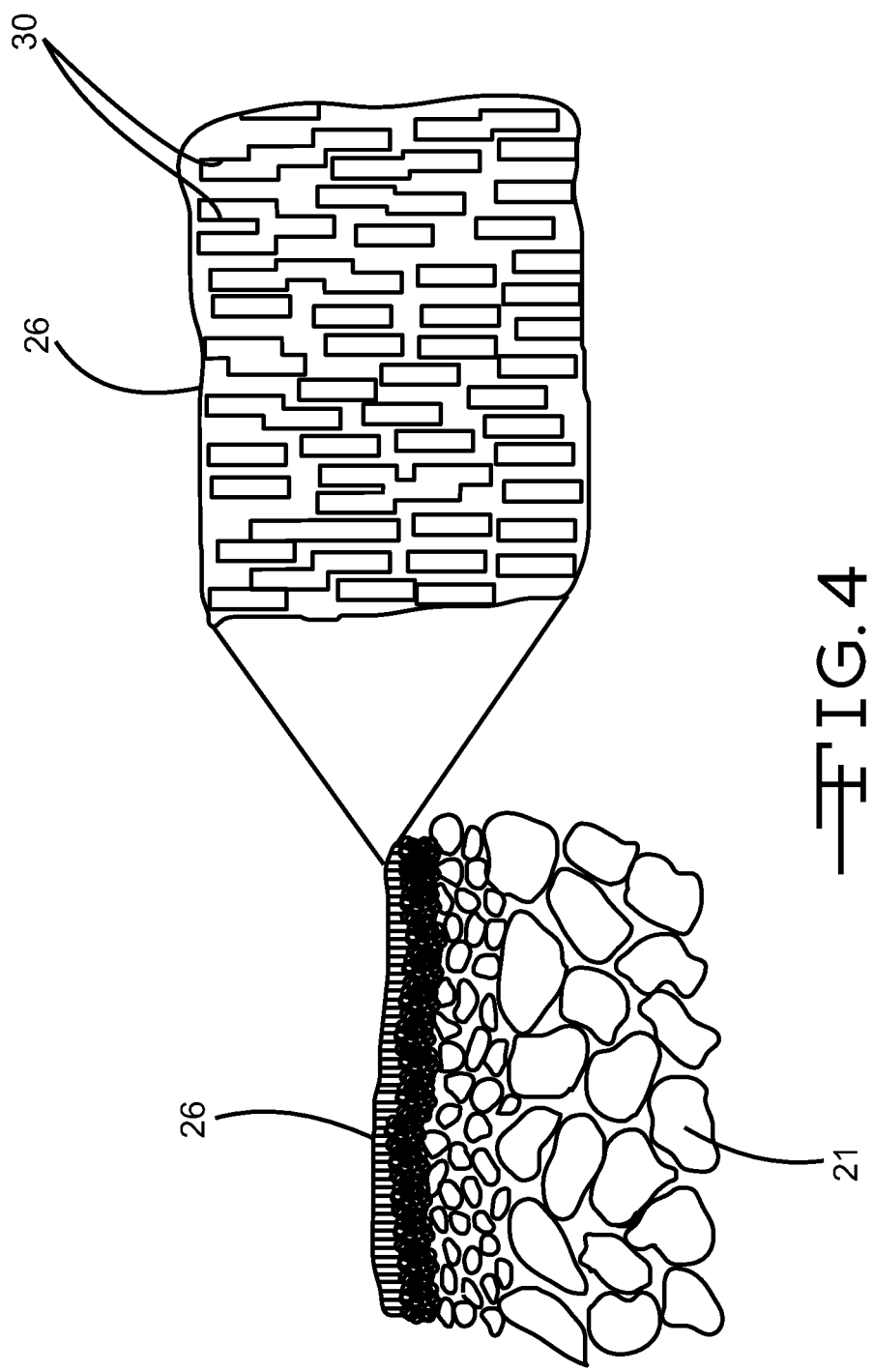
FIG. 4 is a detailed view of the membrane material after calcination.

FIGS. 2-4 illustrate a particular embodiment of a process according to the invention. As shown in FIG. 2, a commercially available ceramic membrane 21 includes a support layer 22 and intermediate layers 24. The intermediate layers are particles of alumina of smaller size than the support layer. They provide a more uniform surface onto which the sol gel layer can be added. The layers can have any suitable thickness; for example, the support layer 22 may have a thickness from 1 to 5 mm and the intermediate layers may have a combined thickness from 40 to 50 µm. The ceramic membrane is dip coated into liquid crystal DNA-sol gel. The DNA-sol gel forms a coating in the form of a membrane 26 on the ceramic membrane 21.

FIG. 3 shows both a cross-section of the ceramic membrane 21 and the DNA-sol gel membrane 26, and a top view of the DNA-sol gel membrane 26. The DNA are self-aligned and oriented perpendicular to the surface. FIG. 4 shows the membrane 26 after the DNA have been removed by calcination, leaving pores 30 in the membrane.

In one embodiment, the process includes an additional step, after removing the template materials to leave the pores, of reducing the diameter of the pores in a controlled fashion. The ability to reduce the diameter of the pores in a controlled fashion could make an entire range of desired pore sizes available. The diameter of the pores can be reduced by any suitable means, for example, by atomic layer deposition or other known methods. This step could also provide the capability of modifying the surface of the pores to provide desired physical and chemical characteristics.

In certain embodiments, when the method uses biopolymers as a template for forming pores in a ceramic material, the removal of the oriented polymers leaves behind channels or pores which are uniform in orientation and diameter. These characteristics convey desirable physical properties for a membrane. Highly oriented pores in a membrane will facilitate the transport of molecules of the appropriate size through the membrane by providing a direct path across the membrane. A direct path will allow a filtration device to operate with a lower pressure drop and higher throughput than a membrane with similar pore sizes but a more indirect or circuitous path. In certain embodiments, the pores may have an order parameter, S, greater than or equal to 0.2. The order parameter of 0.2 corresponds to an average molecular angle with the local director of about 47 degrees. (Liquid crystals are defined by their order parameter, S, where S=0 is completely disordered and S=1 is perfectly aligned.) In certain embodiments, the pores are "ordered" as confirmed by X-ray diffraction and/or electron diffraction using an electron microscope. The material is crystalline with regular ordered spacing. When templating is done with a liquid crystal phase it is possible to determine how broadly the pores are aligned (the order parameter), as well as the orientation within the membrane by XRD (X-ray diffraction), electron diffraction, or SAXS (small angle x-ray scattering) depending on the pore spacing.

The small diameter of the pores allows the separation of small molecules from one another based upon size and physical properties. The pore characteristics left behind by the biopolymer may allow only the passage of very small molecules making the membrane an ideal platform for water purification. The current state-of-the-art technology in forming ceramic membranes with similar pore characteristics uses zeolites. A difficult process of crystallization of the zeolite membrane on a substrate limits the flexibility and scalability of this technology. The present method can use a more flexible sol gel process which simplifies the implementation and adaptation of a highly selective membrane to a broad range of applications and materials.

In another embodiment, the process includes an additional step of attaching catalytic materials to the template materials before providing the sieve material around the template materials, and leaving the catalytic materials attached to or positioned in the pores when the template materials are removed. The use of catalytic materials is described in more detail below.

The invention also relates to an assembly for producing a structure for molecular separations. The assembly includes a substrate, and a plurality of template materials such as those described above on the substrate. The template materials are positioned in an arrangement for leaving pores suitable for molecular separations when the template materials are removed. The assembly also includes a sieve material positioned on the substrate around the template materials, the sieve material having a composition and being shaped for producing the structure for molecular separations after removal of the template materials.

The substrate can be any suitable platform upon which the structure for molecular separations can be produced. For instance, the substrate may be an alumina support. In the example shown in FIG. 1, the assembly 10 includes the substrate 16 which has a surface upon which the sieve material 18 is shaped to produce a membrane 12 for molecular separations.

In another embodiment (not shown), the substrate is a second membrane different from the molecular separations membrane. For instance, as described in the example below, the substrate can be a different filtration membrane, such as a tubular ceramic nanofiltration membrane, or it can be any other suitable membrane having a different function and/or structure. Optionally, the second membrane can be combined with the molecular separations membrane to produce a combination membrane that provides different separations and/or functions.

In another embodiment, the assembly further includes catalytic materials attached to the biopolymers. Such catalytic materials are described in more detail below.

The invention also relates to a membrane for molecular separations. The membrane is made from a sieve material and it has opposed major surfaces. The membrane has pores in at least one of the major surfaces, the pores extending generally perpendicular to the major surface. In some embodiments, the pores extend completely through the membrane between the major surfaces. Most previously known molecular separation membranes have randomly oriented pores that interconnect allowing molecules to eventually find a path through the membrane. The membrane of the invention thus provides an advantage over current technology. The back pressure or pressure drop across the membrane is very low, and the molecules have an easy path through the membrane.

The pores in the membrane can have any diameter suitable for molecular separations. By "diameter" is meant the diameter of the pore if it is circular in cross-section, or the smallest diameter of the pore if it is not circular and thus has different diameters. In certain embodiments, the pores have a diameter between about 5 angstroms and about 30 angstroms. In some particular embodiments, the pores have a diameter between about 5 angstroms and about 10 angstroms, and more particularly between about 6 angstroms and about 7 angstroms. In other particular embodiments, the pores have a diameter between about 5 angstroms and about 20 angstroms, and more particularly between about 6 angstroms and about 15 angstroms.

In some embodiments, the pores are substantially uniform or homogeneous in size, cross-section, orientation and/or in other properties or structures. The pores can have any suitable cross-section, for example a substantially circular cross-section as mentioned above.

The pores can be oriented perpendicular to the major surface of the membrane, or they can be oriented non-perpendicularly. Also, the pores can be oriented parallel with one another or non-parallel. The degree of pore alignment can be adjusted as necessary to the particular application. A higher degree of alignment can increase the porosity of the membrane, and a higher degree of non-alignment can provide more stability to the membrane but reduce its porosity. This feature could be used to tune the membrane characteristics for a particular application.

In certain embodiments, the membranes will separate molecules based upon physical characteristics. A membrane can be made out of ceramic material and have "straight pores" in the above-mentioned pore size range. A separations membrane with these characteristics will have the ability to provide energy efficient purification of alternative fuels from biomass, as well as purification of water produced during oil and gas exploration. An advantage of this technology will be the greater efficiency due to the straight pores which will enable processes using these filters to be performed at lower pressures and using less energy. The tortuosity of the membrane may be used to define the straightness of the pores. Tortuosity is best described as the thickness of the membrane divided by the path length of the pore. In certain examples, the tortuosity of the membrane is not greater than about 10, or not greater than about 5, or not greater than about 2, and more particularly about 1 in some embodiments. The tortuosity can be measured by any suitable method, for example, by image analysis of a cross section of the membrane showing the path of the pores, or by a diffusion method.

The pores can be included in any suitable total numbers and in any suitable numbers per unit area of the membrane. The membrane porosity can be controlled by controlling template material concentration and/or surface density. In some embodiments, the pores are included in an ordered pattern. In some embodiments, the pores are substantially evenly spaced on the membrane surface. Pore density can influence membrane sturdiness. Lower pore density will provide greater average spacing between pores. The spacing will be occupied by membrane material thereby increasing the sturdiness of the membrane.

The pore formation and composition can be modified to achieve desired results. For example, the size of pores can be increased by removal of phosphate (left behind from calcining or supercritical fluid extraction). Alternatively, the size of pores can be decreased by Atomic Layer Deposition (ALD). Further, the pore chemistry can be modified by ALD. The pore hydrophobicity can be increased by methods such as methylation (silica is already hydrophyllic). The removal of phosphates can be facilitated by preventing SiO2 bonds to PO4.

The membrane can have any thickness suitable for molecular separations. In some embodiments, it has a thickness within a range of from about 0.1 micron to about 100 microns. An ultra-thin membrane can be useful for high throughput.

In some embodiments, the membrane further includes catalytic materials attached to or positioned in the pores.

In certain embodiments, the invention relates to a separations module. The membrane is deposited onto one or more surfaces of a porous support, which is part of a separations module. The membrane behaves as the selective layer for separating one or more materials from one or more other materials, in a gas or liquid system. Some features that may part of a module, for example, include a cross-flow/tubular membrane, a flat plate with frame, and/or hollow fibers. The module can include a selective layer integrated into a devide. This can involve a liquid phase, a gas phase, or pervaporation.

The membrane can be useful in many different types of molecular separations, including molecular separations of gases from their mixtures, and molecular separations of chemicals from a liquid. Potential customers are biorefineries which convert woody biomass to sugars, organic acids, and alcohols. Current membrane technologies can separate the sugars from acetic acid and furfurals. However, a new membrane technology is needed which will separate furfural compounds from acetic acid. A great advantage of molecular separation by membranes rather than distillation is lower cost primarily in energy savings. Other industries in which the membrane could be used include oil and petrochemical, coal gasification, pulp and paper, and natural gas producers.

Some particular examples of applications for the separation membrane include alcohol/water separation, dewatering, sugar concentration, and desalination.

Certain examples of applications for a modified membrane/ceramic material according to the invention include the following. For example, such applications can involve a catalyst powder. Clusters of one or more metal atoms and of one or more types of atoms can be attached to DNA at highly specific locations along the DNA length before or after encapsulation of the DNA within a ceramic. This ability provides several advantages and improvements to current catalyst materials.

The metal clusters can be highly dispersed throughout the ceramic material. The metal sites can be of extremely small cluster size. The metal sites can be deposited at the internal surface of the pore walls, providing rapid access. Several metal types can be incorporated into a single cluster. Through the use of synthetic DNA, different metal types can be arranged at preconceived locations along the pore, and at varying proximities to other metal types, which can be used to develop specific catalysts for specific catalytic reactions.

Due to the high cost of some catalyst metals, such as platinum, the high dispersal and small cluster size produced with these methods provide a cost improvement highly desired in the catalyst market.

The catalyst powder can be used in different applications. For example, it can be applied to fuel cells which use Pt (most expensive part). For example, catalytic powders can be used as a coating for proton exchange membranes. As another example, it can be applied to catalytic converters that use Pt and Rh. Other applications include most uses of catalyst where cost of metal is high or high dispersion and small particle size is difficult to produce.

Catalytic membranes can be produced through the methods previously discussed and with the attachment of metals (cisplatin, etc.) to DNA prior to or after encapsulation. Catalytic membranes can conduct catalysis and separation simultaneously, or can be used to remove the catalyzed components from a liquid or gas flow.

Porous hollow spheres can also be produced according to the invention. For example, hollow spheres can be produced with porous ceramic walls that exhibit many of the properties discussed here including composition, pore size, pore orientation, surface chemistry, temperature and chemical stability, and catalyst properties. Porous hollow spheres can be produced by coating a DNA-templated ceramic onto spherical particles or powders such as dendrimers or beads of polystyrene, latex, or the like. Curing of the ceramic followed by removal of the spheres and DNA template by calcining or other methods discussed will produce the desired hollow sphere, the size of which can be tailored by the choice of sphere being used. Thickness of the hollow sphere wall can be tailored by the addition of more or less templated ceramic material.

The implementation of the technology in the context of composite, multilayered, and/or catalytic separation systems can provide molecular separation systems which can be adapted for use in a variety of applications. For example, a membrane which has the ability to separate molecules and perform catalysis is highly desired in the areas of water purification, carbon monoxide remediation, and syngas production just to name a few.

The invention also relates to a process of producing a catalyst. The process includes attaching catalytic materials to template materials, positioning a catalyst substrate material around the template materials, and removing the template materials to leave pores in the catalyst substrate material, with the catalytic materials attached to or positioned in the pores.

Any suitable catalytic materials can be used, such as metal atoms, metal ions or metal oxides. Suitable catalytic metals are well known, such as platinum, beryllium, rhodium, etc. Combinations of two or more catalytic materials can also be used. Also, any suitable template materials can be used, such as any of those described above or others. Further, any suitable catalyst substrate material can be used. It can be a ceramic material such as described above or any other material known for use as a catalyst substrate.

In some embodiments, the template materials are positioned on a surface, and the catalyst substrate material is applied onto the surface and around the template materials. This usually shapes the catalyst into the form of a membrane. However, other embodiments do not use a surface and/or produce catalysts with different shapes.

The catalytic materials are attached to locations on the template materials, which can be predetermined or random locations. Typically, when the template materials are removed from the catalyst substrate material, the catalytic materials are attached to corresponding locations on the pores of the substrate. In some embodiments, two or more different catalytic materials are attached to each of the template materials, so that when the template materials are removed the two or more catalytic materials are attached to or positioned in the pores.

In some embodiments, the pores are positioned so that the catalyst also functions as a molecular sieve, but in other embodiments it functions solely as a catalyst.

Metal ions bind to nucleic acids through ionic and/or covalent interactions with the phosphodiester backbone or the aromatic rings. This property can be used with the membrane templating innovation described above to produce membranes with pore structures with surfaces which are decorated with metal atoms or ions. It is conceivable that a variety of physical and chemical characteristics (e.g., selective molecular binding, catalytic activity, etc.) can be chosen based on the metals bound to the template material prior to templating the membrane.

In a particular example, DNA can be used as a means to distribute metals in the pores of the membrane. Several transition metal (platinum, rhodium, rhenium, etc.) compounds bind to DNA. If these metal compounds are bound to the DNA when the DNA is used in templating a membrane it is possible to create a new class of catalysts with a high degree of control of composition (catalyst cluster size and distribution). The advantages would be improved dispersal of the catalyst and the ability to create well-defined binary (e.g., Pt—Rh) or ternary (e.g., Pt—Rh—Re) or higher complexity catalysts with very unique properties. Another advantage would be the ability to create not just a catalyst but also a material that could perform separation and catalysis simultaneously.

In another particular example, a catalyst can be made that is not restricted to a layer or film. A bulk sol gel material with metal-DNA complexes encapsulated within it is made. The DNA is removed by high temperatures (calcining) leaving behind a ceramic material with random or aligned pore orientation but decorated metal catalytic sites (metal atoms, ions, or oxides). This material could then be further processed and utilized as a catalyst.

EXAMPLE 1

A ceramic membrane for molecular separations (hereinafter "molecular separations membrane") is produced as follows. A tubular ceramic nanofiltration membrane (hereinafter "nanofiltration membrane") is used as a substrate for forming the molecular separations membrane. The nanofiltration membrane is dipped into a sol-gel which contains DNA molecules, forming a coating on the nanofiltration membrane. The sol-gel coated nanofiltration membrane is then placed in a strong magnetic field which aligns the DNA molecules perpendicular to the surface of the nanofiltration membrane while the sol-gel polymerizes and forms a ceramic membrane. Once the sol-gel is solidified, the DNA molecules are removed by calcining, leaving pores in the ceramic membrane producing the molecular separations membrane.

The result is a combination ceramic membrane which includes a tubular nanofiltration membrane coated with a molecular separations membrane. The combination membrane has the high selectivity of the molecular separations membrane and the utility of the nanofiltration membrane. The molecular separations membrane allows separation of very small molecules (1 nm to 2 nm) from larger molecules.

The combination ceramic membrane may be used in a variety of different applications. For example, it may be used in a cross-flow filtration process in which the feed stream moves parallel to the membrane filtration surface. Molecules larger than the pore size of the molecular separations membrane will pass through the long channels of the tubular nanofiltration membrane. The small molecules will pass through the molecular separations membrane as part of the permeate. An example of an application of this technology would be in the area of biorefinery commodity chemical separation.

EXAMPLE 2

Task 1—Formation of Liquid Crystalline DNA in a Sol-Gel:

i. Rationale: The liquid crystalline state is a phase of matter that is ordered like crystalline solids but flows like a liquid. High density packing of polyanions like DNA can only be accomplished if the charge-charge repulsion of the phosphate groups is minimized by the addition of counterions. The structure of a hexagonal liquid crystalline phase of 150 base pair lengths of double-stranded DNA has been studied by small angle neutron scattering. In this study, hexagonal phase liquid crystalline monovalent tetramethylammonium ($TMA^+$) ions were used as counterions to facilitate the formation of the liquid crystalline state. The spacing between the long axes of the DNA in this state was determined to be 4 nm. Segments of DNA up to 100 persistent lengths (~5 μm) were shown to exhibit local hexagonal structure.

ii. Experimental Design and Methods: Several lengths of DNA ranging from 150 base pairs to 2000 base pairs can be produced by nuclease digestion of calf thymus DNA with subsequent separation by size exclusion chromatography. Design of Experiments (DoE) has been used to elucidate the optimum experimental conditions under which DNA will form a liquid crystalline state in the presence of the sol-gel. A table of 28 samples to be synthesized and screened has been generated.

Input factors for this study include DNA concentration, sol-gel reactants, temperature, and pH. An experimental matrix was generated based on a D-Optimal design. Because of the large number of possible conditions it was not practical to run a full factorial design. The D-optimal design option is an effective way to spread the points in experimental space to generate informative, non-redundant results. The upper and lower bounds defined the ranges which encompass the optimum conditions to form a sol-gel liquid crystalline DNA composite material. The synthesis could also utilize cationic molecules which are similar to TMA but facilitate the formation of liquid crystalline DNA (e.g., spermine, spermidine, and putrescine). The formation of the liquid crystalline state of DNA in the presence of sol-gel forming compounds could prove to be difficult. The Design of Experiments method (DoE) to select the optimum parameters described in this step will help establish optimum synthesis conditions.

iii. Data Analysis and Interpretation: Once the DNA templated material is formed it will be characterized using a variety of methods. DNA absorbs UV light very strongly having an extinction coefficient of 6600 $M^{-1}$ $cm^{-1}$ at 260 nm. If the DNA is encapsulated in the porous material there will be a strong UV absorbance of the material after extensive washing. Scanning electron microscopy will be used to confirm the presence of any long range order. Successful synthesis will be confirmed through the observation of hexagonal phase order of channels up to about 7 μm in length. Xray diffraction (XRD) and AFM will be utilized to determine the ordered state of the material. Previous XRD results of materials that have highly uniform pores with long range ordering will be compared to the results obtained for Task 1 (ii). The final step of Task 1 will be to remove the DNA. This will be done by calcining which is a common process for template destruction used in zeolite synthesis by heating to high temperature in the presence of air. The sample DNA/sol-gel composite will be heated in the presence of air to remove the DNA. The optimum temperature will be the minimum temperature necessary to completely remove the DNA. Characterization of the porous material was performed by XRD as described above. A new method to estimate surface area of porous silica using FT-IR will be employed.

iv. Potential Problems/Alternative Approaches: Removal of the DNA by calcining may introduce pore defects. The rate at which the sample is heated and cooled is can affect template removal and prevention of defects in the membrane. Various temperature ramping protocols may be investigated. Chemical detachment or breakdown of the DNA are options to be explored should the calcining process prove detrimental to the membrane channels.

v. Outcomes: Data analysis showed that DNA has been successfully encapsulated in silica. The DNA-silica composite was ordered along the long axis of the DNA. Once the optimum conditions for removing DNA from the DNA-silica composite are determined, a highly porous ceramic material will be generated. The parallel pore structure of this new material will be visualized by electron microscopy.

EXAMPLE 3

Synthesis of a DNA Templated Membrane

An innovation of using DNA as a template is the potential to manipulate it and create pores perpendicular to the membrane surface. The alignment of the membrane pores is dependent on the aligmnent of the DNA before calcination. Several methods for DNA alignment will be considered. The optimal method is that which is the easiest to implement in a cost-effective manner with respect to scale-up of the technology. Once an alignment methodology has been established in aqueous environments, the alignment procedures will be verified in the presence of the sol-gel starting materials. Success will be determined by the solidification of oriented liquid crystalline DNA in a sol-gel, which will be verified by cross-polarized microscopy.

Experimental Design and Methods

The following parameters will be adjusted to obtain the optimum pore orientation on a nonporous support:

Concentration of DNA. The liquid crystalline phase is dependent on DNA concentration. The long range ordering of the DNA is dictated by the liquid crystalline phase. Therefore, manipulation of the DNA concentration in the sol-gel will be the first parameter to be adjusted to induce the proper alignment.

Solvent Conditions. The upper limit to DNA solubility is dependent on solvent conditions.

The sol-gel in which the DNA is dissolved acts as the solvent. The parameters of the solvent that can be manipulated are pH, salt concentration, ethanol concentration, and water concentration.

Surface Modification. DNA is a negatively charged polymer. It is possible that the DNA strands will overcome the aligning forces to form various liquid crystalline phases and lie down on the surface of the substrate. This would inhibit the ability of the DNA to form pores that would allow molecular transfer across the membrane. Therefore, a method to inhibit the interaction of the DNA with the surface may be needed. Organosilane chemistry can be used to reduce the polarity (increase hydrophobicity) of silica. DNA will have a reduced interaction directly with the surface. The result could allow the forces that induce alignment in the various liquid crystalline phases to orient the DNA more perpendicularly to the surface.

Electric Field. Pore orientation of the DNA templated membrane can be controlled using an electric field. The orientation of DNA can be manipulated by an electric field. Electric field orientation methodology is based on liquid crystal display (LCD) technology. A solution of DNA will be sandwiched between two ITO-coated (indium-tin-oxide) glass slides. Orientation of the DNA molecules will be controlled by an electric field generated between the ITO electrodes. Changes in the liquid crystalline orientation of DNA will be monitored by cross-polarized light microscopy.

Following is a description of a particular example of using LCD optics. Multilayer composition (sequential layers A through F) of an LCD display is used as a model for creating electric field orientational test for liquid crystalline DNA. The DNA occupies a thin film in layer C of the image. Layers B and D are glass substrates with conductive ITO coating. Layers A and E, which have the light polarizing films, represent the crossed polarizing lenses of a light microscope.

In particular, Layer A is a vertical filter film to polarize the light as it enters. Layer B is a glass substrate with indium tin oxide electrodes. The shapes of these electrodes will determine the dark shapes that will appear when the LCD is turned on. Vertical ridges are etched on the surface so the liquid crystals are in line with the polarized light. Layer C is twisted nematic liquid crystals. Layer D is a glass substrate with common electrode film (ITO) with horizontal ridges to line up with the horizontal filter. Layer E is a horizontal filter film to block/allow light through. Layer F is a reflective surface to send light back to the viewer.

For the first three methods described, a solution of DNA will be sandwiched between a glass slide and a cover slip. When the electric field alignment method is attempted, a solution of DNA will be sandwiched between two ITO-coated (indium-tin-oxide) glass slides.

Data Analysis and Interpretation

Each of the different methods will produce a layer of polymerized silica sol-gel with DNA encapsulated within the matrix. Long-range order such as a liquid crystalline state will exhibit birefringence as polarized light passes through the ordered material. Liquid crystalline states of DNA exhibit unique birefringence patterns. Digital images of the patterns produced by varying DNA concentration, solvent conditions, surface modification, and the electrical potential between the electrodes will be stored on a computer which is connected to Zeomatrix' polarizing light microscope equipped with a digital camera.

Identification of the various phases of liquid crystalline DNA-sol-gel composites will use two different imaging methods—light microscopy (LM) and scanning electron microscopy (SEM). LM images acquired from the liquid crystalline states of the DNA as a function of the various conditions will be compared to published images of known liquid crystalline phases of DNA to identify precholesteric, cholesteric, and smectic phases similar to Phase I results obtained by Zeomatrix. SEM images processed using NIH Image J software will be used to evaluate the ordered structure of the DNA. Spatial arrangements, area, mean, centroids, perimeters, can all be measured using this software package. SEM cross-sectional images will be used to investigate pore alignment. Analysis of the SEM image data using tools within NIH Image software should provide the ability to measure average orientation of the DNA with respect to the substrate surface.

iv. Potential Problems/Alternative Approaches

Potential Problem: Electric field not sufficient to induce pore alignment in sol gel. Solution: Try alternate alignment procedure(s):

An alternate method of pore alignment includes chemically bonding ends of the double stranded fish sperm DNA to the surface by a method developed to attach single stranded DNA to alumina. Amino silane N-(2-aminomethyl)-3-aminopropyl trimethoxysilane (AEAPS) can be used to silanize the surface of the alumina substrate. The terminal primary amine of the AEAPS will covalently bond to the terminal phosphate of the DNA through a carbodiimide cross-linking mechanism. The result will be a single layer of double stranded fish sperm DNA with a length of ~100 base pairs with one end attached to the surface. There may be a tendency for the DNA to lie down on the surface, which contains primary amines, since these amines are positively charged at neutral pH and the DNA is negatively charged. This effect will be minimized by pretreating the DNA with a positively charged amino silane. The amino silane aminopropyltriethoxysilane (APTES) will also facilitate formation of the sol-gel close to the DNA molecules. The attached monolayer of DNA will be too thin to perform as an effective separations membrane, but instead will act as a directing agent for aligning a subsequent layer of liquid crystalline DNA templated material.

v. Expected Outcomes

We anticipate long range ordering of the DNA on the surface. The DNA is likely to be oriented at an angle less than 90°. If the average angle is greater than 40° with respect to the surface, the pores that will result from the removal of the DNA should allow efficient molecular transfer.

Task 2—Dip Coat and Characterize a Templated Z-SEP™ Membrane on a Porous Support.

i. Rationale

The Phase I/IB project developed both the template and dip coating methods needed to form a DNA templated membrane. The development work was performed using glass slides as the support for the membrane. The prototype membrane will be supported by a porous material with the following characteristics: planar, composed of a ceramic material, multilayered with macroporous, mesoporous, and microporous zones. For the prototype development Zeomatrix will use γ-alumina supports provided by Inocermic GmbH, and coating procedures developed during Phase I/IB. The porous support will allow for measurements of pore alignment and flow rates. Membrane properties such as single gas permeance, pore size distribution, porosity, and selective layer thickness will also be studied. It is anticipated that the conditions for dip coating a porous support may not be the same as the nonporous support due to different surface adhesion properties. The composite alumina supports will be 2 cm in diameter, 3 mm thick, with an average pore diameter of 10 nm. These supports are comprised of a 10 nm porous γ-alumina on top of more porous alpha-alumina layers. The Z-SEP™ prototype membranes will be formed by dip coating the porous support into encapsulated DNA sol-gel precursor solution which has been prepared as per the methodology developed during Phase I/IB. The membranes will be dried and then calcined as per the methodology developed for Phase I/IB. Additional methodology will need to be developed for the final process which will involve sintering of the Z-SEP™ layer to the underlying support. This methodology development is broken out into a separate task (Task 3).

ii. Experimental Design and Methods

Step 1. Dip Coating

The procedure will consist of submerging the support into a solution of liquid crystalline DNA sol-gel material. Phase II work will be performed at the Zeomatrix facility using custom-built equipment which will allow for more precise and reproducible "draws" of the support through the sol-gel solution. The support is allowed to rest in the material for several seconds allowing the sol-gel to adhere to the surface. The support is then withdrawn at a constant predetermined rate producing a membrane layer of uniform thickness. Thickness is influenced by sol-gel viscosity as well as withdrawal speed. Membrane defects can be introduced during the drying step. Therefore, the evaporation rate will be regulated by performing the dip coating process within a temperature and humidity controlled chamber purchased from Electro-Tech Systems, Inc. A remotely controlled motor will be set up within the environmental chamber to provide precise and reproducible control of the dip coating speed and angle.

Step 2 Calcining: Calcining will be performed at Zeomatrix using the procedure established in Phase I/IB. After this step the membranes will be characterized to determine the average pore size, pore size distribution, pore alignment, extent of defects, and membrane thickness.

iii. Data Analysis and Interpretation

Membrane thickness will be measured by cross-sectional imaging using SEM. Adsorption branch hexane porosimetry or permporometry will be used to quantify defects and measure average pore size and pore size distribution. This method measures the active pores (ones that traverse the membrane) by measuring the controlled blocking of pores by a condensable vapor and measuring the flux of another noncondensible gas through the membrane. Partial vapor pressure of hexane is varied over a wide range to act as the blocking agent. Helium gas flow rate is measured as a function of hexane activity (hexane vapor pressure normalized to saturation pressure of hexane). The activity of hexane is related to pore size, $R_p$, using the Kelvin equation where a is the surface tension of hexane, $V_m$, is the molar volume of hexane, R is the gas constant, T is the temperature, a is hexane activity, and t is the thickness of the adsorbed monolayer.

$$R_P = \frac{-4\sigma V_m}{RT\ln(a)} + t$$

The Kelvin equation governs how condensation occurs in larger pores as hexane vapor is exposed to the membrane. The pore size distribution, $f(R_p)$ will be calculated using the following relationship where l is the membrane thickness, M is the molecular weight of the permeate, and F is the permeance of the inert gas based on the expression for Knudsen transport.

$$f(R_p) = \frac{-3l}{2R_p^3} \sqrt{\frac{MRT}{8\pi}} \frac{dF}{dR_p}$$

Single gas permeation measurements will determine the permeance of the membrane. Single gas permeance will also be used to quantify defect flow by measuring the fraction of viscous flow through the membrane. The quality of the membrane is determined by plotting the permeance against the average pressure drop across the membrane. Defects from cracks or pinholes in the selective layer will be evident with a positive dependence of permeance on the average pressure drop. Viscous flow will bypass the selective pores and pass through the defects. These measurements are standard techniques used to characterize ceramic membranes.

iv. Potential Problems/Alternative Approaches.

Dip coating procedure for the porous support may have to be changed significantly from the nonporous support. Systematic changes in the dip coating procedure (draw rate and humidity) will be performed to find a method that applies a relatively uniform layer in the desired thickness range of 1 to 5 microns as determined by SEM.

If the SEM at LaSST that we would use is not able to perform at the highest resolution needed, then Zeomatrix will use an outside analytical lab for the SEM image analysis.

v. Expected Outcomes

Expected outcomes are: deposition of a 1 to 5 micron thick membrane on a porous support with a mean pore size in the 1 to 3 nanometer range, $N_2$ gas permeance on the order of $10^{-6}$ mol m$^{-2}$ s$^{-1}$ Pa$^{-1}$, and a percentage of flow due to defects at less than 10%.

Task 2 encompasses the ongoing membrane characterization which needs to be performed throughout the entire project.

Task 3—Minimize Defects in Prototype Z-SEP™ Membrane.

i. Rationale Defects in the Z-SEP™ membrane such as cracks or delamination from the substrate must be resolved before the next phase of the project can begin. Defect formation can occur during the dip-coating/drying or calcining/sintering steps. Defects must be minimal in order to evaluate the Z-SEP™ membrane during the pervaporation test (Task 4). Higher flux rates combined with better separation factors will be achieved when molecular flow occurs primarily through the membrane pores, and not through the larger, less selective defects.

ii. Experimental Design and Methods

The selective silica membrane layer must be bonded to the substrate. Sintering is a common method for achieving this, however maintaining the pore dimensions will limit the sintering temperature. The temperature at which pores begin to change structure in porous silica membranes starts around 600° C. In order to avoid pore collapse the removal of the DNA must be done at the lowest possible temperature. Thermogravimetric analysis (TGA) will allow the monitoring of the change in mass of a sample as it is heated. Once the DNA has been completely removed this will set the lowest temperature needed to remove the DNA. Attenuated total reflectance Fourier Transform Infrared spectroscopy (ATR-FTIR) permits the analysis of the chemical composition of solid materials on a surface and will be used to monitor the composition of the membrane. Higher temperatures will be used to sinter the membrane. The membrane pore characteristics will be monitored as a function of sintering temperature. These temperatures provide us with an operating range in which to determine optimum sintering temperatures for the Z-SEP™ product. The elimination of defects is the goal of this step. Cracking, lifting, and delamination of the selective layer are real possibilities.

Defects in a membrane can be minimized by applying multiple coats of the selective layer. After each dip coat the membrane is calcined and the process is repeated. However, a thicker selective layer can limit characteristics of membrane performance such as flux. Also, if the layer becomes too thick the membrane will also have a tendency to form cracks upon drying or calcining. An optimum thickness can be found between these two extremes. After a layer is applied by the dip coating method and dried subsequent layers will be applied by repeating the same process. The membranes will be carefully dried, calcined, and characterized as described above. The relationship between number of dip-coats and defects, permeance, and pore size distribution will be established. This procedure will determine the best compromise between defects and membrane performance limit the defects but it will also reduce the permeance of the membrane by increasing the selective layer thickness. Analysis of the relationship between membrane thickness and gas permeance will be tested by measuring single gas permeance through a range of membranes of varying thickness.

Defect formation from the dip coating process can be affected by the membrane thickness (withdrawal rate), drying rate (humidity controlled), and sol gel chemistry. A reduction in the number of defects will be verified by a decrease in hexane porosimetry baseline. The parameters of the dip coating procedure will be studied as they relate to the formation of defects in the deposited membrane. Gas flow through defects will be tested by hexane porosimetry after dip coating experiments and before calcination to show improvements in the dip coating process.

A measure of defects will be performed on a set of membranes calcined following the procedures developed in phase IB and will show the effects of calcining temperature and heating rate on defect formation. Membrane defects allow molecular flow that bypasses the pore structure resulting in an increase in flow with an increase in pressure. This effect will be observed by monitoring the relationship between permeance and pressure drop across the membrane, ΔP. A positive slope indicates the presence of defects. Calcining and sintering will thereafter be carried out in the same step. The furnace temperature will be ramped up to the calcination temperature and held for a period of time to allow completion of calcination. The temperature will be raised further to complete the sintering step. A set of experiments will be preformed on a series of identical membranes sintered in a programmable furnace and will study the effects of calcining and sintering temperatures and heating rates. The membranes will be analyzed by hexane porosimetry at LaSST to provide the percentage of gas flow through defects. These results will allow us to optimize the heating parameters to minimize defect formation during the calcining and sintering steps.

The efficacy of DNA alignment on membrane performance will be determined. Templated membranes with and without alignment will be produced and evaluated to determine defects, permeance, and pore size distribution.

iii. Data Analysis and Interpretation

ATR-FTIR spectra will give evidence for the presence or removal of the DNA templating material. The same data analysis and interpretation for pore characteristics, permeance, and defects as outlined in Task 2 will be applied to Task 3. The different approach in this Task is the systematic application of procedures to minimize defects. As the pressure is increased, any observed increase in permeance will be due to gas flow through defects. Permeance will be graphed as a function of pressure drop, ΔP, across the membrane. A positive slope indicates the presence of defects. A slope zero for permeance vs. ΔP indicates the absence of defects. Reduction in the number and extent of defects will result in a decrease in the slope of the permeance vs ΔP line.

iv. Potential Problems/Alternative Approaches

Problem: Elimination of defects causes dramatic reduction in membrane permeance. This could be due to multiple dip coat method. It is possible that after calcining a membrane layer to remove the DNA template the pores left behind get plugged with the next sol-gel dip.

Solution: Try calcining after multiple dip coats are complete.

v. Expected Outcomes

Our goal will be a membrane with less than 5% defect flow as measured by light gas porosimetry.

What is claimed is:

1. An assembly for producing a structure for molecular separations comprising:
    a substrate;
    a plurality of template materials positioned on the substrate, the template materials being double-stranded DNA molecules, the template materials positioned in an arrangement for leaving pores suitable for molecular separations when the template materials are removed, such that the pores formed by the double-stranded DNA molecules are substantially uniform in width along their length; and
    a sieve material positioned on the substrate around the template materials, the sieve material having a composition and being shaped for producing the structure for molecular separations after removal of the template materials.

2. The assembly of claim 1 wherein the substrate has a surface upon which the sieve material is shaped to produce a membrane for molecular separations.

3. The assembly of claim 2 wherein the membrane produced is a first membrane and the substrate is a second membrane.

4. The assembly of claim 1 further comprising catalytic materials attached to the template materials.

5. The assembly of claim 4 wherein the catalytic materials are transitions metals.

6. The assembly of claim 4 wherein the catalytic materials are metal atoms, metal ions or metal oxides.

7. The assembly of claim 2 wherein the membrane has opposing major surfaces.

8. The assembly of claim 7 wherein the pores extend generally perpendicular to the opposing major surfaces.

9. The assembly of claim 7 wherein the pores extend through the membrane between the opposing major surfaces.

10. The assembly of claim 2 wherein the membrane has a thickness within a range of from about 0.1 micron to about 100 microns.

11. The assembly of claim 1 wherein the sieve material is a ceramic material.

12. A process of producing a structure for molecular separations comprising:
    providing an assembly comprising:
        a substrate;
        a plurality of template materials positioned on the substrate, the template materials being double-stranded DNA molecules, the template materials positioned in an arrangement for leaving pores suitable for molecular separations when the template materials are removed, such that the pores formed by the double-stranded DNA molecules are substantially uniform in width along their length; and
        a sieve material positioned on the substrate around the template materials, the sieve material having a composition and being shaped for producing the structure for molecular separations after removal of the template materials; and removing the template materials to leave pores in the sieve material that are substantially uniform in width along their length, thereby producing the structure suitable for molecular separations.

13. The process of claim 12 wherein the sieve material is formed into a membrane and the template materials are positioned to leave substantially aligned pores in the membrane.

14. The process of claim 13 wherein the template materials are attached to a surface of the substrate and the sieve material is applied onto the surface and around the template materials to form the membrane.

15. The process of claim 13 wherein the membrane has opposing major surfaces.

16. The process of claim 15 wherein the pores extend generally perpendicular to the opposing major surfaces.

17. The process of claim 15 wherein the pores extend through the membrane between the opposing major surfaces.

18. The process of claim 13 wherein the membrane has a thickness within a range of from about 0.1 micron to about 100 microns.

19. The process of claim 12 wherein the sieve material produces a ceramic structure.

20. The process of claim 12 further comprising, after removing the template materials, reducing the diameter of the pores in a controlled fashion.

21. The process of claim 12 further comprising attaching catalytic materials to the template materials, and leaving the catalytic materials attached to the pores when the template materials are removed.

22. The process of claim 21 wherein the catalytic materials are transitions metals.

23. The process of claim 21 wherein the catalytic materials are metal atoms, metal ions or metal oxides.

* * * * *